United States Patent
Silver

(10) Patent No.: US 9,215,728 B2
(45) Date of Patent: *Dec. 15, 2015

(54) SYSTEM, METHOD, AND COMPUTER-READABLE MEDIUM FOR SCHEDULE-BASED TELECOMMUNICATION POLICIES

(71) Applicant: Tango Networks, Inc., Plano, TX (US)

(72) Inventor: Andrew Silver, Frisco, TX (US)

(73) Assignee: TANGO NETWORKS, INC., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,226

(22) Filed: Mar. 16, 2015

(65) Prior Publication Data

US 2015/0189671 A1 Jul. 2, 2015

Related U.S. Application Data

(63) Continuation of application No. 11/942,568, filed on Nov. 19, 2007, now Pat. No. 8,983,506.

(51) Int. Cl.

| | |
|---|---|
| *H04W 4/00* | (2009.01) |
| *H04W 4/02* | (2009.01) |
| *H04W 4/16* | (2009.01) |
| *H04M 3/42* | (2006.01) |
| *H04W 24/00* | (2009.01) |
| *G06Q 10/10* | (2012.01) |
| *H04W 72/12* | (2009.01) |
| *H04M 3/436* | (2006.01) |
| *H04L 29/06* | (2006.01) |
| *H04W 40/20* | (2009.01) |

(52) U.S. Cl.
CPC ....... *H04W 72/1257* (2013.01); *H04L 65/1069* (2013.01); *H04M 3/436* (2013.01); *H04W 4/16* (2013.01); *H04W 40/20* (2013.01); *H04M 2203/2072* (2013.01)

(58) Field of Classification Search
CPC ............... H04M 1/72572; H04M 1/72566; H04M 1/72577; H04M 1/72569; H04W 4/02; H04W 4/021; H04W 4/028; G06Q 10/1095; G06Q 10/1093
See application file for complete search history.

(56) References Cited

U.S. PATENT DOCUMENTS

| | | | | |
|---|---|---|---|---|
| 5,742,905 A | * | 4/1998 | Pepe et al. | 455/461 |
| 6,732,080 B1 | * | 5/2004 | Blants | 705/7.18 |
| 7,023,979 B1 | * | 4/2006 | Wu et al. | 379/265.11 |

(Continued)

*Primary Examiner* — Matthew Sams

(57) ABSTRACT

A system, method and computer-readable medium for enforcing user telecommunication privileges on a per-schedule basis are provided. Enterprise members may have a schedule associated therewith that defines scheduled locations of the users. Telecommunication service privileges may be coordinated with the users' schedules such that communication services are disabled at particular times based on the users' schedules. In other implementations, particular users may have telecommunication services disabled by an administrator in the event of a catastrophe or emergency. By this mechanism, users that are not proximate to a particular catastrophe or emergency area according to the users' schedule may have services disabled while other users that are located more proximate to the emergency may have their telecommunication services enabled. In this manner, the demand on a cellular network may be alleviated thereby increasing the likelihood that users directly impacted by the emergency may receive and place calls or access data services.

20 Claims, 9 Drawing Sheets

(56) References Cited

U.S. PATENT DOCUMENTS

| | | | |
|---|---|---|---|
| 7,072,457 B2 * | 7/2006 | Brown et al. | 379/211.01 |
| 7,353,034 B2 * | 4/2008 | Haney | 455/457 |
| 7,400,891 B2 * | 7/2008 | Aaron | 455/456.4 |
| 7,428,417 B2 * | 9/2008 | Caspi et al. | 455/456.1 |
| 7,693,734 B2 * | 4/2010 | Christenson et al. | 705/7.19 |
| 7,853,271 B2 * | 12/2010 | Doyle | 455/456.2 |
| 8,112,100 B2 * | 2/2012 | Frank et al. | 455/456.4 |
| 8,311,513 B1 * | 11/2012 | Nasserbakht et al. | 455/410 |
| 8,983,506 B2 * | 3/2015 | Silver | 455/461 |
| 2006/0068812 A1 * | 3/2006 | Carro et al. | 455/456.3 |
| 2006/0160523 A1 * | 7/2006 | Erskine et al. | 455/405 |
| 2009/0067603 A1 * | 3/2009 | Mohler | 379/202.01 |
| 2009/0131060 A1 * | 5/2009 | Silver | 455/445 |

\* cited by examiner

SYSTEM, METHOD, AND COMPUTER-READABLE MEDIUM FOR SCHEDULE-BASED TELECOMMUNICATION POLICIES

CROSS-REFERENCE TO RELATED APPLICATIONS

This application claims priority of and is a continuation of U.S. Ser. No. 11/942,568, entitled "SYSTEM, METHOD, AND COMPUTER-READABLE MEDIUM FOR SCHEDULE-BASED TELECOMMUNICATION POLICIES" filed Nov. 19, 2007, now issued U.S. Pat. No. 8,983,506, issued on Mar. 17, 2015, which is incorporated herein by reference for all purposes.

FIELD OF THE INVENTION

The present disclosure relates to telecommunications and, more particularly, to enforcing user privileges in a telecommunications system according to a schedule-based policy.

BACKGROUND

Cellular service has conventionally been controlled by wireless carrier networks and managed independently of, and with no connectivity to, enterprise voice and data networks. Enterprises today control their enterprise fixed voice and data networks by deployment of private branch exchanges (PBXs). The enterprise may own and manage PBXs within each branch and between branch offices. The enterprise may also manage their own data networks and corporate local area network (LAN)/wide area network (WAN). Bulk voice minutes and data capacity may be purchased from land-line carriers, or from other providers that have purchased bulk minutes and data capacity from carriers. The purchased capacity may then be used to connect branch offices using public IP Network providers, e.g., MCI, Sprint, L3, etc., for Data and Voice over IP (VoIP).

A premise with numerous members or users may have various facilities. The use of cellular communication devices on such premises is often prohibited or discouraged. For example, some schools have banned cellular telephone usage due to class interruptions and/or students cheating during exams by accessing the Internet on their mobile phones, text messaging other students for exam answers, or by other mechanisms. However, there are many cases when it may be desirable for students or faculty to be equipped with cellular telephone service, e.g., in the case of a natural disaster, a campus emergency, or other distress. For example, numerous school shootings have been well documented in the United States. In such situations, law enforcement may be greatly aided by receiving reports from students or faculty regarding an assailant or other information regarding an in-progress crime. Because such cases are high profile and quickly reported by various media, cellular systems often become overwhelmed due to students and family members placing calls to other students or family members. The high number of calls placed during such an event can quickly consume the cellular system capacity to the point where calls are unable to be placed to or from a cellular customer in a service area corresponding to the emergency.

Heretofore, no mechanisms have been provided to alleviate the above disadvantages.

SUMMARY OF THE INVENTION

Embodiments disclosed herein provide mechanisms for enforcing user telecommunication privileges on a schedule basis. Using mechanisms described herein, users of an enterprise or other campus or entity may have a schedule associated therewith that defines scheduled locations of the users. Telecommunication service privileges may be coordinated with the users' schedules such that certain services are disabled at particular times based on the users' schedules. In other implementations, particular users may have telecommunication services disabled by an administrator, e.g., in the event of a catastrophe or emergency. By this mechanism, users that are not proximate to a particular catastrophe or emergency area according to the users' schedules may have services disabled while other users that are located more proximate to the emergency may have their telecommunication services enabled. In this manner, the demand on a cellular network may be alleviated thereby increasing the likelihood that users directly impacted by the emergency may receive and place calls or access data services.

BRIEF DESCRIPTION OF THE DRAWINGS

Aspects of the present disclosure are best understood from the following detailed description when read with the accompanying figures, in which.

DETAILED DESCRIPTION

Figure 1:
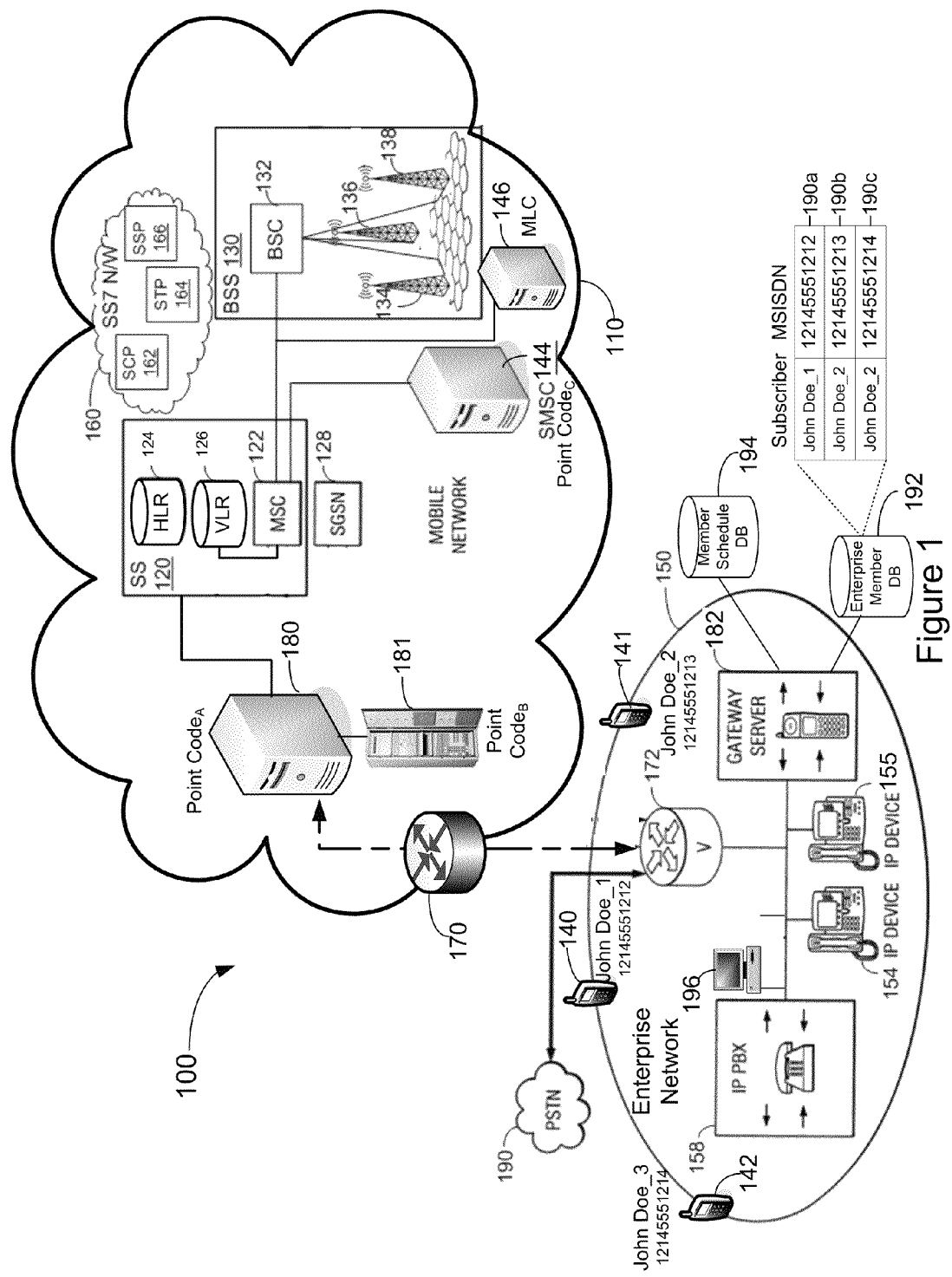
FIG. 1 is a diagrammatic representation of a network architecture in which embodiments disclosed herein may be implemented.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

With the ubiquity of cellular communication devices, it is desirable to seamlessly integrate public wireless voice and data networks with enterprise networks. More particularly, it is desirable to provide enterprise cellular solutions that may operate in conjunction with public network infrastructure. As referred to herein, an enterprise may comprise a corporation, an education facility, or any other entity that may have infrastructure to which a plurality of cellular telecommunication users may have access. As referred to herein, a member refers to a user of the enterprise infrastructure. For example, in the event that the enterprise is implemented as a corporation, a member may refer to an employee of the enterprise. Similarly, in the event that the enterprise is implemented as an education facility such as a university, a member may refer to a student or faculty of the university.

In accordance with the present disclosure, the enterprise may maintain a schedule that defines times and locations, e.g., a particular building and office or room of the building, where members are scheduled to be located. A gateway server inter-connects a carrier network's Mobile Switching Center (MSC) that manages cellular voice traffic as well as the carrier's Serving GPRS Support Node (SGSN) that manages cellular data traffic, with the enterprise's voice and data network. In accordance with a particular embodiment, a carrier gateway server (GS-C) deployed in a cellular network is interconnected with an enterprise gateway server (GS-E). Within the enterprise network, a member schedule is maintained and may be interfaced with the GS-E. Service Policies may be enforced by the GS-E according to the schedule. Further, a system administrator may disable, e.g., in the case of an emergency, certain telecommunication services for particular members according to members' scheduled locations while other members' telecommunication services are enabled based on those members' locations.

FIG. 1 is a diagrammatic representation of a network architecture in which embodiments disclosed herein may be implemented. Network 100 may include a cellular network system 110, such as a Global System for Mobile (GSM) Communications network, a code division multiple access (CDMA) network, a mobile network utilizing IMT-2000, or another suitable mobile network. Cellular network system 110 generally includes a Switching System (SS) 120 and a Base Station System (BSS) 130. In the examples provided herein, mobile network architecture components are made with reference to the GSM, the most popular standard for mobile phones in the world. GSM is both an air interface and networking protocol. The most popular alternative combines the Code Division Multiple Access (CDMA) air interface protocol and the ANSI-41 networking protocol.

Each of SS 120 and BSS 130 contain a number of functional units well understood by those skilled in the art, and a detailed explanation of the various components is unnecessary. Nevertheless, a cursory review of various components is provided. SS 120 contains a Mobile services Switching Center (MSC) 122, a Home Location Register (HLR) 124, and a Visitor Location Register (VLR) 126. MSCs carry out switching functions and manage the communications between mobile phones and the Public Switched Telephone Network (PSTN) 190. HLR 124 comprises the central database that contains details of each mobile phone subscriber that is authorized to use the cellular core network. VLR 126 comprises a database which stores information about all the mobiles terminals that are currently serviced by the associated MSC (MSC 122 in the present example). VLR 126 stores various information regarding the mobile terminals, such as the current location area identity that specifies a particular base station controller (BSC) that the mobile station is currently serviced by.

Various other sub-systems or functional modules may, and typically are, included in SS 120, such as an Authentication Center, an Equipment Identity Register, or various other functions. A serving general packet radio service (GPRS) support node (SGSN) 128 may be included in cellular network system 110 to facilitate provisioning of packet services to and from mobile terminals in network system 110. GPRS provides mobility management, session management and transport for Internet Protocol packet services in GSM cellular packet networks.

As is understood, various GPRS infrastructure may be included in network system 110 to provide packet services to mobile terminals, and only SGSN 128 of the GPRS core network is depicted to simplify the discussion of embodiments disclosed herein. In general, a gateway GPRS support node may interface the GPRS backbone with an external packet network, such as the Internet.

SGSN 128 may interface with various subsystems of network system 110. For example, SGSN 128 may have a Gs interface with MSC 122 and VLR 126 that facilitates paging and station availability notification when performing data transfers. SGSN 128 may additionally have a Gr interface with HLR 124 through which messaging may be performed, for example, over the Mobile Application Part protocol. SGSN 128 may additionally have a Gb interface with packet control unit (PCU) (not shown) of BSS 130 that facilitates connection of BSS 130 with SGSN 128.

Network system 110 may also include a signaling system, such as a SS7 network 160. SS7 network 160 provides a set of telephony signaling protocols which are used to set up the vast majority of the world's PSTN telephone calls. SS7 network 160 is also used in cellular networks, such as GSM and UMTS, for circuit switched voice and packet-switched data applications. As is understood, SS7 network 160 includes various signaling nodes, such as any number of service control points (SCPs) 162, signal transfer points (STPs) 164, and service switching points (SSPs) 166.

BSS 130 contains a Base Station Controller (BSC) 132 that may be in communication with and in control of a plurality of Base Transceiver Stations (BTSs) 134-138. Each individual BTS 134-138 under the control of a given BSC 132 may define a radio cell operating on a set of radio channels thereby providing service to a Mobile Terminal.

Network system 110 may also include a Mobile Location Center (MLC) 146 that may communicate with a plurality of Mobile Switching Centers (MSCs) 122 and Base Station Controllers (BSCs) 132 for the purpose of obtaining highly granular location information of a mobile telephone such as MT 140-142.

Network system 110 may also include a short message service center (SMSC) 144 adapted to deliver short message service (SMS) messages to mobile terminals. When an SMS message is sent to a user, the SMS message is stored in SMSC 144 which delivers it to the destination mobile terminal when the destination mobile terminal is available. As is known, the SMS message may be delivered via a control channel, e.g., a cell broadcast control channel, or bearer channel.

Network 100 may include an enterprise network 150, such as a switched Ethernet, that interconnects various network nodes via various network infrastructure, such as hubs and switches. Enterprise network 150 may include various client nodes, such as desktop clients, land-line Internet Protocol (IP) telephones 154-155, and an IP private branch exchange (PBX) 158 which carries calls over IP, e.g., via voice over IP (VoIP). Enterprise network 150 may interface with the PSTN 190 via a router 172 disposed at the enterprise.

Likewise, enterprise network 150 may interface with cellular network system 110 via routers 170 and 172. It is understood that enterprise network 150 may, and typically does, include hundreds or thousands of client devices and networking nodes, and the architecture depicted in FIG. 1 is greatly simplified to facilitate a discussion of embodiments disclosed herein.

In accordance with an embodiment, an enterprise gateway server (GS-E) 182 may be deployed in enterprise network 150 that is adapted to inter-connect the mobile network's MSC 122 that manages cellular voice traffic as well as the SGSN 128 that manages cellular data traffic. To this end, GS-E 182 may interface with a carrier gateway server (GS-C) 180. The network may also include a softswitch media gateway 181. From an IT organization perspective, GS-C 180 appears as an extension to PBX 158. To cellular network system 110, GS-C 180 appears as a standard in-network endpoint for delivering calls. To PBX 158, GS-C 180 appears as a set of standard PBX endpoints (e.g. deskphones, or IP clients). GS-C 180 mediates between the two disparate sets of network protocols and state machines.

GS-C 180 may include the network functions for both voice (gateway MSC) and data (gateway GPRS Support Node or Home Agent), VoIP capability for interconnecting mobile network 110 with enterprise network 150 thereby eliminating PSTN interconnect charges, a billing gateway, and a next-generation Network Services gateway that enables third party value added services for the enterprise, such as mobile phone activation/de-activation, corporate directory integration based on IMS (IP Multimedia Subsystem), or other services. Gateway server 180 may also include the element management subsystem (EMS) and a service management subsystem for the operational support system (OSS).

The connection between GS-E 182 and GS-C 180 may be made over SIP or other protocols. This configuration may enable cellular network system 110 to have a central point of control for interacting with multiple enterprises, and may not require the use of SS7 messaging to the enterprise. Rather, it is possible to have a secure IP connection supporting SIP. This is also useful for offering a Centrex solution for interconnecting with a carrier-hosted PBX, or for interconnecting a carrier-hosted gateway server with enterprise-hosted PBX 158 systems. GS-C 180 may support an SS7 point code multiplexer in which only one or two point codes are needed to address all enterprises since GS-C 180 can identify for which enterprise the message is intended. In the illustrative example, GS-C 180 has a point code "Point Code$_A$" and softswitch media gateway 181 has a point code "Point Code$_B$". Originating and terminating triggers used in cellular network system 110 for routing calls to GS-C 180 can add identifying information of the specific enterprise in the triggering messages. Alternatively, GS-C 180 may identify the enterprise based on the calling party information.

In the illustrative examples provided herein, three mobile terminal (MT) users (illustratively designated "John Doe_1"-"John Doe_3") are members of enterprise network 150 and are assigned respective mobile terminals 140-142. MT 140 is assigned a MSISDN of 1-214-555-1212, MT 141 is assigned an MSISDN of 1-214-555-1213, and MT 142 is assigned an MSISDN of 1-214-555-1214.

GS-E 182 may include or interface with an Enterprise member database 192 that stores records or profiles that define services for members of enterprise network 150. Enterprise member database 192 may include a record allocated for enterprise members that have mobile telecommunication services managed by GS-E 182. In the present example, records 192a-192c respectively associate a subscriber or member name with an MSISDN of the member's mobile terminal.

The enterprise may maintain a member schedule database 194 that maintains schedules of enterprise members. The schedules may include daily, weekly, or other scheduling blocks that specify where a particular member is scheduled to be located. For example, if the enterprise comprises an education facility such as a college, the enterprise members in this instance may comprise students and faculty. Accordingly, member schedule database 194 may maintain schedules of students and faculty that specify times at which members are scheduled to be at a particular location, e.g., in a particular class held in a specific building and room.

In an embodiment, GS-E 182 may interface with schedule database 194, e.g., via an application programming interface (API), for issuing queries to determine members' scheduled locations. Queries of schedule database 194 may, for example, be issued from an administrator client system 196. Commands for disabling particular telecommunication services of members may also be issued from administrator client system 196, e.g., in the event of an emergency, as described more fully hereinbelow.

Figure 2:
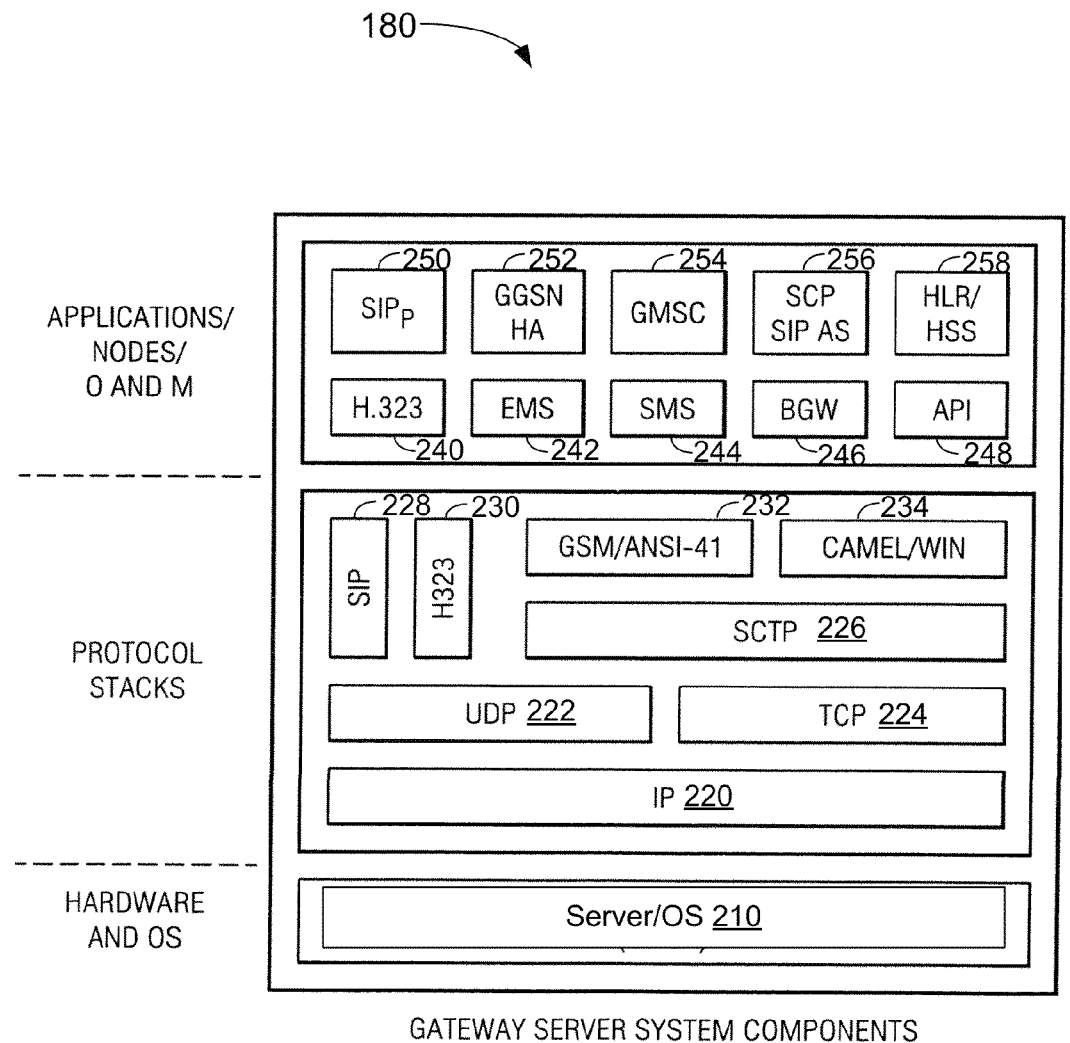
FIG. 2 is a diagrammatic representation of an embodiment of carrier gateway server depicted in FIG. 1.

FIG. 2 is a diagrammatic representation of an embodiment of GS-C 180 depicted in FIG. 1. GS-C 180 includes hardware and an operating system 210, such as an instance of the Unix operating system. Various protocol stacks may be deployed and run by the gateway server. In the illustrative example, the gateway server includes a network layer 220, such as an Internet Protocol layer. Transport layer(s), such as user datagram protocol (UDP) 222, transport control protocol (TCP) layer 224, and stream control transmission protocol (SCTP) layer 226, may be included in the gateway server and interface with the lower network layer 220 and applications above the transport layer. Application layers that interface with lower transport layers may include a session initiation protocol (SIP) layer 228 for creating, modifying, and terminating sessions with one or more devices and H.323 compliant layer 230 for provisioning of communication sessions over a packet network. The gateway server additionally includes mobile networking protocol layers, such as ANSI-41 and GSM layers 232. Advanced intelligent network and wireless intelligent network capabilities may be provided by the gateway server via, for example, a Customized Applications for Mobile networks Enhanced Logic (CAMEL) layer 234 and/or a wireless intelligent network (WIN) layer that allows an operator to define services over and above standard services provided by the GSM standards. The gateway server may include any variety of applications, such as H.323 communication application 240, an element management subsystem 242, a short message service system 244, BGW 246, and an application programming interface 248. Additionally, the gateway server may include a session initiation protocol layer 250, gateway GPRS support node home agent application 252, gateway mobile services switching center 254, session control protocol 256, and home location register/home subscriber server application 258. Various other applications may be included in addition to, or in lieu of, any one or more of the depicted applications.

The gateway server enables the enterprise to manage and control its cellular service in addition to providing a significant overall cost reduction for telecommunications. Moreover, the gateway server includes an overall platform and architecture for improved and integrated wireless enterprise solutions and facilitates convergence between the enterprise's cellular and Voice over IP (Internet Protocol) infrastructure.

The gateway server leverages the benefits of Voice over IP with cellular to extend the cellular network into the enterprise. The gateway server addresses both cellular voice and data, and is a networking solution that works together with the enterprise's existing PBX, performing mobile session control functions (routing and services) for voice and data.

Additionally, the gateway server bridges the enterprise PBX and public cellular environments to enable telecom applications for the cellular user, such as short-code dialing (e.g. 4 and 5-digit dialing), one number service (one phone number for the land-line and cellular phone), and single voice mail box that services both a user's land-line and cellular telephone. The gateway server enables the enterprise to leverage existing telecom assets for cellular use (e.g., least-cost routing over a corporation's VoIP or leased-lines network for discounted long distance, use of existing PBX voicemail system, etc.).

The gateway server is an application platform for deploying mobile IT applications. Either the enterprise IT department or a Systems Integrator may develop and integrate specific applications to interface with the corporation's cellular devices. For example, the enterprise can choose to replace the desk phone of an enterprise member with an inexpensive mobile phone. For this member, when they 'badge-out' of the building at the end of the day, the enterprise security system can be used to inform the gateway server to de-activate the mobile phone, until the member returns and 'badges-in' the next morning. Alternatively, the gateway server can track and record calls made outside the office hours, and enable the enterprise to charge them to the business, to the employee, or record them as an enterprise benefit.

The gateway server may be a software-only solution that can execute on standard, inexpensive Linux platforms. The gateway server may comprise a mobile core network (for call handling and routing) and services network (voice and data services such as PBX-based short code dialing, voicemail, conference calling, VPN, etc.) components. It may be appropriately scaled down to the smaller subscriber base of a decentralized large enterprise, in the order of hundreds to several thousand subscribers, compared with carrier systems that manage many millions of "centralized" subscribers. The gateway server is designed to be managed and maintained by the same IT group that currently manages the enterprise's PBX system.

Figure 3:
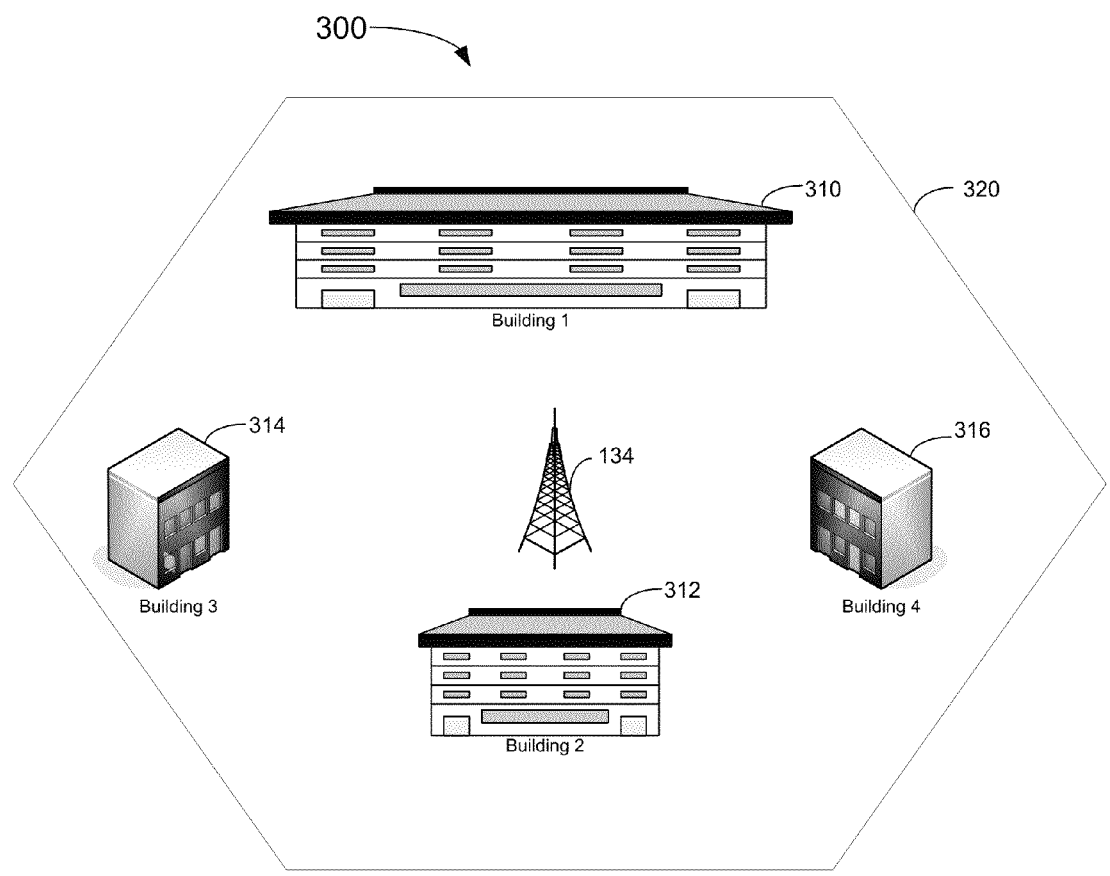
FIG. 3 is a diagrammatic representation of enterprise facility in which schedule-based telecommunication policies may be enforced in accordance with an embodiment.

FIG. 3 is a diagrammatic representation of enterprise facility 300 in which schedule-based telecommunication policies may be enforced in accordance with an embodiment. Facility 300 may comprise any number of buildings 310-316 illustratively designated "Building_1"-"Building_4". Enterprise facility 300 may comprise, for example, an educational facility, such as a university or high school, a corporate facility, or other organization entity that may have members associated therewith.

In the illustrative example, assume enterprise facility 300 is located in a geographic area of a cell site 320 provisioned by a BTS 134 of cellular network system 110 depicted in FIG. 1. Further assume enterprise network 150 depicted and described in FIG. 1 is deployed in facility 300 and is interconnected with cellular network system 110. In an embodiment, schedule-based communication service policies are enforced on enterprise member mobile terminals as described more fully hereinbelow.

Figure 4:
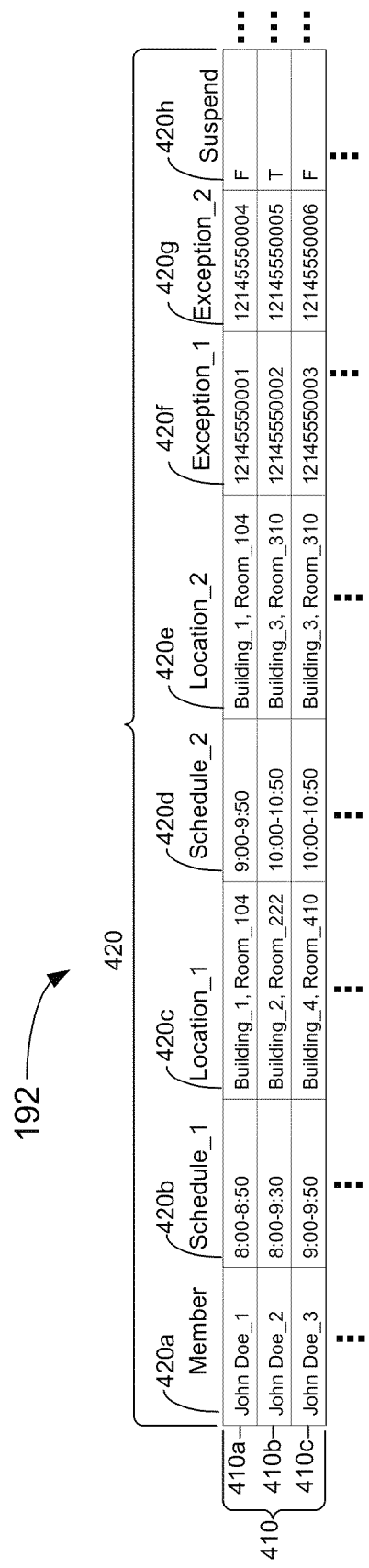
FIG. 4 diagrammatic representation of an embodiment of a schedule database configured for enterprise member schedules.

FIG. 4 diagrammatic representation of an embodiment of a schedule database 194 configured for enterprise member schedules. In the illustrative example, database 194 comprises a table comprising a plurality of records 410a-410c (collectively referred to as records 410) and fields 420a-420h (collectively referred to as fields 420) although other data structures may suitably be substituted therefore. Database 194 may be stored on a disk drive or other storage device, fetched therefrom, and processed by a data processing system, such as a processor of GS-E 182.

Fields 420a-420h have a respective label, or identifier, that facilitates insertion, deletion, querying, or other data operations or manipulations of database 194. In the illustrative example, fields 420a-420h have respective labels of "Member", "Schedule_1", "Location_1", "Schedule_2", "Location_2", "Exception_1," "Exception_2", and "Suspend".

The Member field 420a includes data elements that specify an enterprise member, e.g., a first and last name. Field 420b specifies a schedule time during which a member of a corresponding record 410a-410c is scheduled to be in a location specified by corresponding Location field 420c. Thus, for example, the member "John Doe_1" is scheduled to be located in building 310 ("Buidling_1") in a room designated "Room_104" from 8:00-8:50. In a similar manner, schedule field 420d specifies a scheduled time during which a member is scheduled to be located in a location specified by corresponding location field 420e.

In accordance with an embodiment, GS-E 182 may be configured to prohibit communication services to mobile terminals of members according to the members' schedules. For instance, in an embodiment, voice and data services may be prohibited from originating from, or terminating to, a mobile device of a member when the member is scheduled to be in a particular enterprise location. Thus, for example, GS-E 182 may prohibit voice and data sessions from or to mobile terminal 140 assigned to "John Doe_1" from 8:00-8:50 and 9:00-9:50. Assume, for example, that an attempt to place a call from mobile terminal 140 is made at 8:10. The call request is first routed to GS-C 180, which is configured to recognize mobile terminal 140 as assigned to a member of enterprise network 150. Accordingly, the call request is routed to GS-E 182 from GS-C 180 for call processing. When the call attempt is received by GS-E 182, GS-E 182 may identify "John Doe_1" as the member assigned to mobile terminal 140, e.g., via interrogation of member database 192. GS-E 182 may then interrogate schedule database 194 to identify the schedule of the member associated with mobile terminal 140. In this instance, record 410a, or a portion thereof, may be returned to GS-E 182. A comparison of the current time as maintained by GS-E 182 with the schedule results in a determination that the member currently has a scheduled location. Accordingly, GS-E 182 may then transmit a failure notification to GS-C 180, which in turn may notify MT 140, and the call attempt is then terminated or other suitable treatment such as playing a recording indicating that this call cannot proceed at this time. In a similar manner, an incoming call placed to MT 140 when the member assigned to MT 140 is scheduled to be in an enterprise location results in routing of the call from GS-C 180 to GS-E 182 for call processing instructions. On receipt of the inbound call setup request, GS-E 182 determines the called member is scheduled to be in an enterprise location, and may then provide a call rejection notification to the GS-C 180. GS-C 180 may, in turn, notify the calling party that the call has been rejected. Alternatively, GS-C 180 may terminate the call with a voice mail system.

In accordance with another embodiment, exceptions to the schedule-based policy enforcement may be allowed by specifying numbers to which calls may be originated or from which calls may be received. For example, if GS-E 182 is deployed in a high school, students may be prohibited from receiving calls or placing calls during scheduled class periods, but may have exemptions to allow placement and reception of calls from particular individuals, such as the students' parents, school principal, or other person or entity designated as an exception. To this end, schedule database 194 may specify exceptions that define phone numbers that students may receive calls from and/or place calls to. In the illustrative example, fields 420f-420g specify exceptions comprising phone numbers that are to be allowed to be terminated with a member's mobile terminal regardless of whether the member is scheduled to be in an enterprise location when the call is placed or received.

Figure 5:
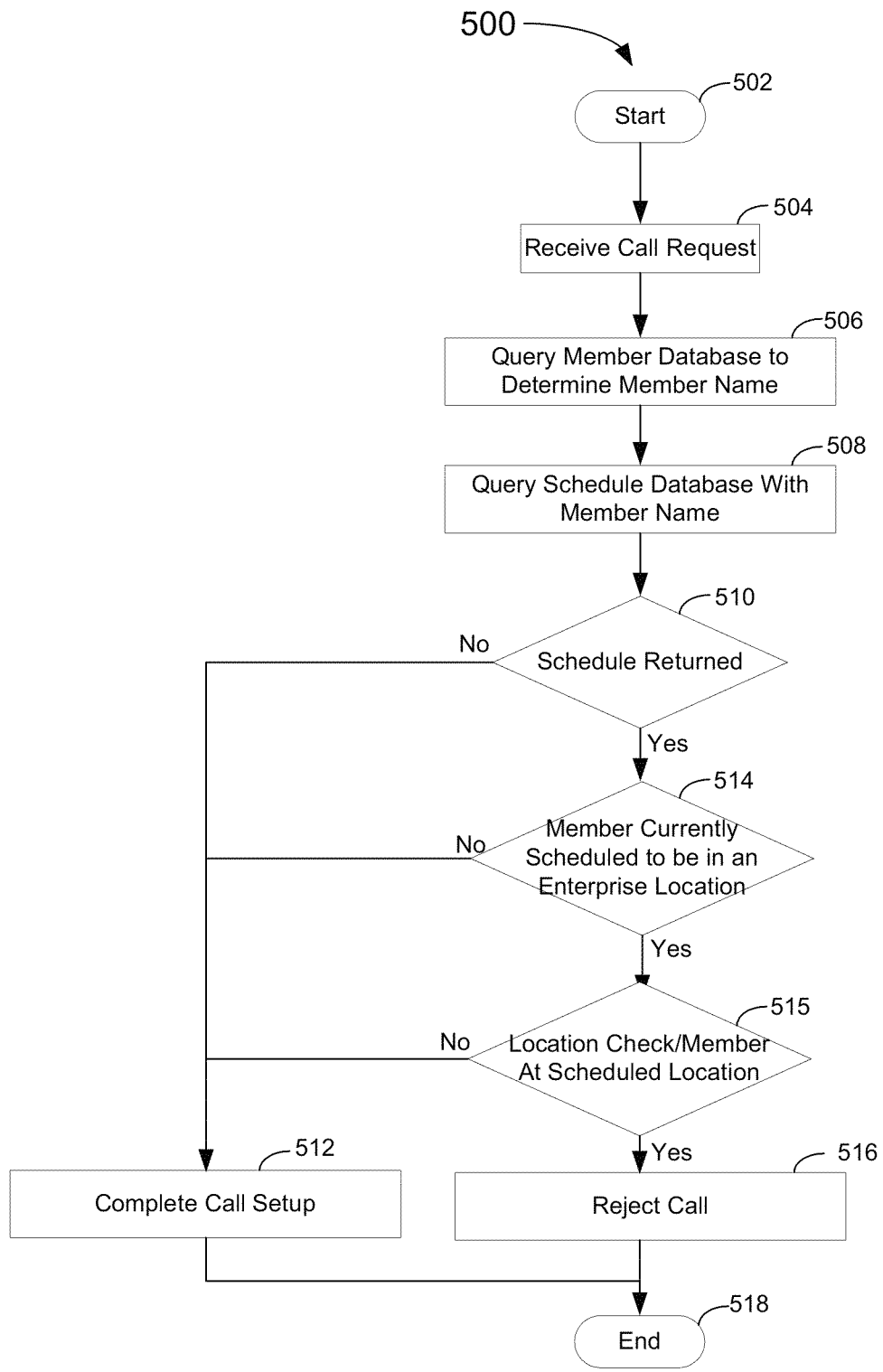
FIG. 5 is a flowchart depicting a schedule-based communications policy enforcement routine implemented in accordance with an embodiment.

FIG. 5 is a flowchart 500 depicting a schedule-based communications policy enforcement routine implemented in accordance with an embodiment. The policy enforcement routine may be implemented on a computer-readable medium as computer-executable instructions that are fetched from a processing system, such as GS-E 182, and processed thereby.

The policy enforcement routine is invoked (step 502), for example on receipt of an outbound or inbound call request (step 504), i.e., a call placed by an enterprise member or a call directed to an enterprise member. The telephone number of the call request may then be used to interrogate member database 192 to determine the member's name (step 506). Schedule database 194 may then be queried with the member's name (step 508). GS-E 182 may then evaluate whether a schedule was received from member database 194 (step 510). In the event that a schedule is not returned responsive to the schedule database query, GS-E 182 may then complete the call setup (step 512), and the policy enforcement routine cycle may then end (step 518).

Returning again to step 510, in the event that a schedule is returned, GS-E 182 may then evaluate the schedule to determine if the member is currently scheduled to be in an enterprise location (step 514). For example, GS-E 182 may compare a clock maintained thereby or interfaced therewith with schedule fields of the returned schedule. If the member is not scheduled to be in an enterprise location, GS-E 182 may complete the call setup according to step 512. If the member is currently scheduled to be in an enterprise location, GS-E 182 may proceed to perform a location check to evaluate if the member is currently located at the scheduled location (step 515). The location check may be implemented as a subroutine for evaluating a member's current location as described more fully hereinbelow with reference to FIG. 9. If it is determined that the member is located at the scheduled location, the GS-E 182 may then reject the call (step 516), and the policy enforcement routine cycle may then end according to step 518. If it is determined that the member is not currently located at the scheduled location, GS-E 182 may complete the call setup according to step 512.

In an alternative embodiment, a call may be allowed within a predefined time period, e.g., 3 minutes, when a member is scheduled to be at an enterprise location. For example, assume GS-E 182 is configured to allow a call to or from a member MT if the call is placed within a member scheduled time period for up to 3 minutes. In this instance, a call placed by MT 140 at 8:00 may be allowed, but a call placed any time between 8:03 and 8:47 would be rejected.

In accordance with another embodiment, a schedule-based communications policy enforcement routine may restrict communication capabilities based on both a member schedule and location. For example, particular enterprise locations may have a communication restriction policy assigned thereto, while other enterprise locations do not have such a restriction policy.

Figure 6:
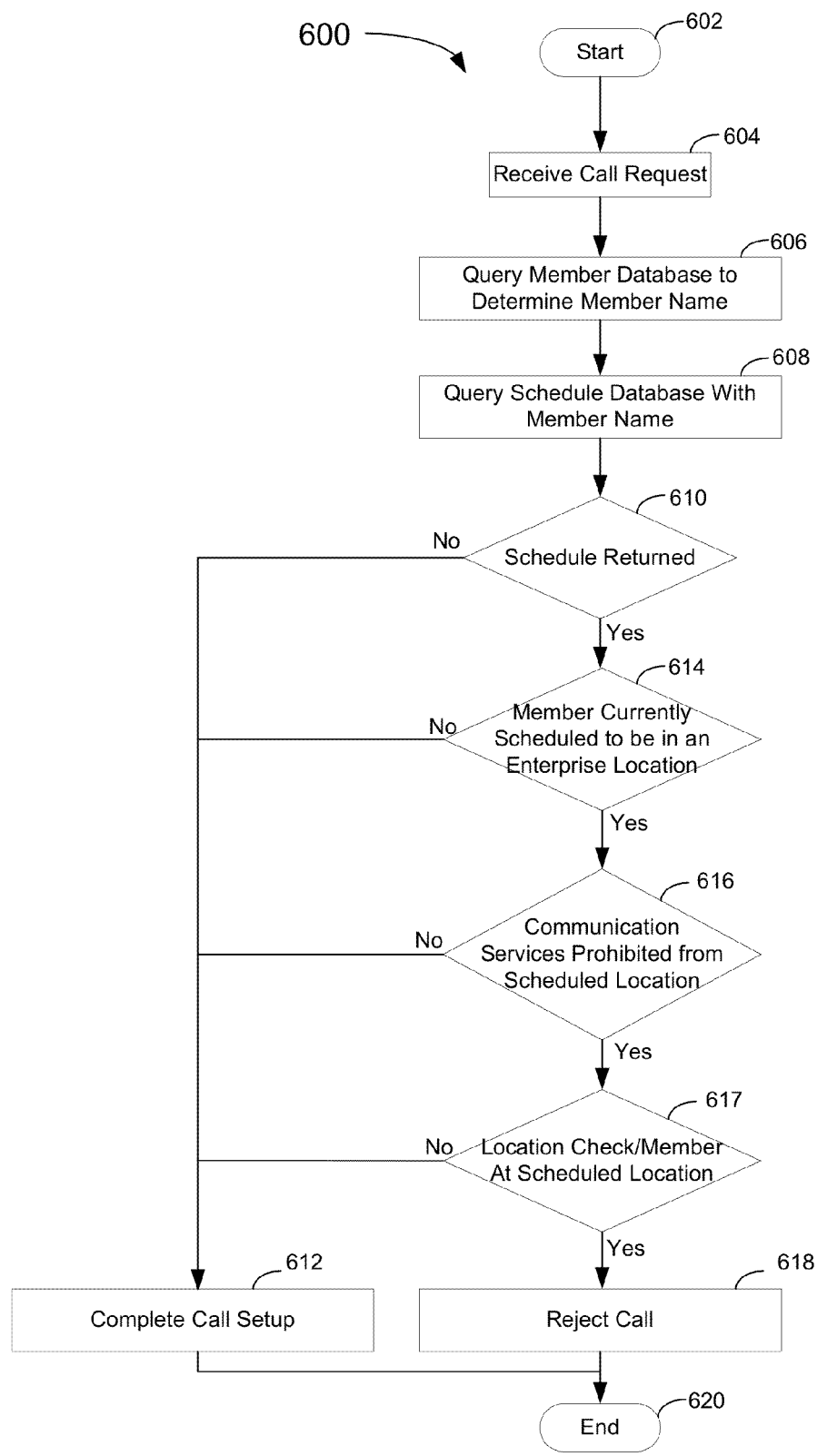
FIG. 6 is a flowchart depicting processing of a schedule and location-based communications policy enforcement routine for restricting communication service privileges based on a member schedule and location.

FIG. 6 is a flowchart 600 depicting processing of a schedule and location-based communications policy enforcement routine for restricting communication service privileges based on a member schedule and location. The policy enforcement routine of FIG. 6 may be implemented on a computer-readable medium as computer-executable instructions that are fetched from a processing system, such as GS-E 182, and processed thereby.

The policy enforcement routine is invoked (step 602), for example on receipt of an outbound or inbound call request (step 604), i.e., a call placed by an enterprise member or a call directed to an enterprise member. The telephone number of the call request may then be used to interrogate member database 192 to determine the member's name (step 606). Schedule database 194 may then be queried with the member's name (step 608). GS-E 182 may then evaluate whether a schedule was received from member database 194 (step 610). In the event that a schedule is not returned responsive to the schedule database query, GS-E 182 may then complete the call setup (step 612), and the policy enforcement routine cycle may then end (step 620).

Returning again to step 610, in the event that a schedule is returned, GS-E 182 may then evaluate the schedule to determine if the member is currently scheduled to be in an enterprise location (step 614). For example, GS-E 182 may compare a clock maintained thereby or interfaced therewith with schedule fields of the returned schedule. If the member is not scheduled to be in an enterprise location, GS-E 182 may complete the call setup according to step 612. If the member is currently scheduled to be in an enterprise location, GS-E 182 may then evaluate the enterprise location at which the member is scheduled to be located to determine if the location is prohibited from communication services (step 616). In the event that the enterprise location at which the member is scheduled to be located is not designated as prohibited for communication services, setup of the call may then be completed according to step 612. If the location at which the member is scheduled to be located is designated as prohibited from communication services, GS-E 182 may proceed to perform a location check to evaluate if the member is currently located at the scheduled location (step 617). The location check may be implemented as a subroutine for evaluating a member's current location as described more fully hereinbelow with reference to FIG. 9. If it is determined that the member is not currently located at the scheduled location, GS-E 182 may then complete the call setup according to step 612, and the policy enforcement routine cycle may then end according to step 620. If it is determined that the member is located at the scheduled location, the GS-E 182 may then reject the call (step 618), and the policy enforcement routine cycle may then end according to step 620.

In accordance with another embodiment, exceptions or exemptions to the schedule-based policy enforcement may be allowed by specifying numbers to which calls may be originated or from which calls may be received. In this manner, members may be prohibited from receiving calls or placing calls during scheduled class periods, but may have exemptions to allow placement and reception of calls from particular individuals regardless of whether the member is scheduled to be in an enterprise location when the call is placed or received.

Figure 7:
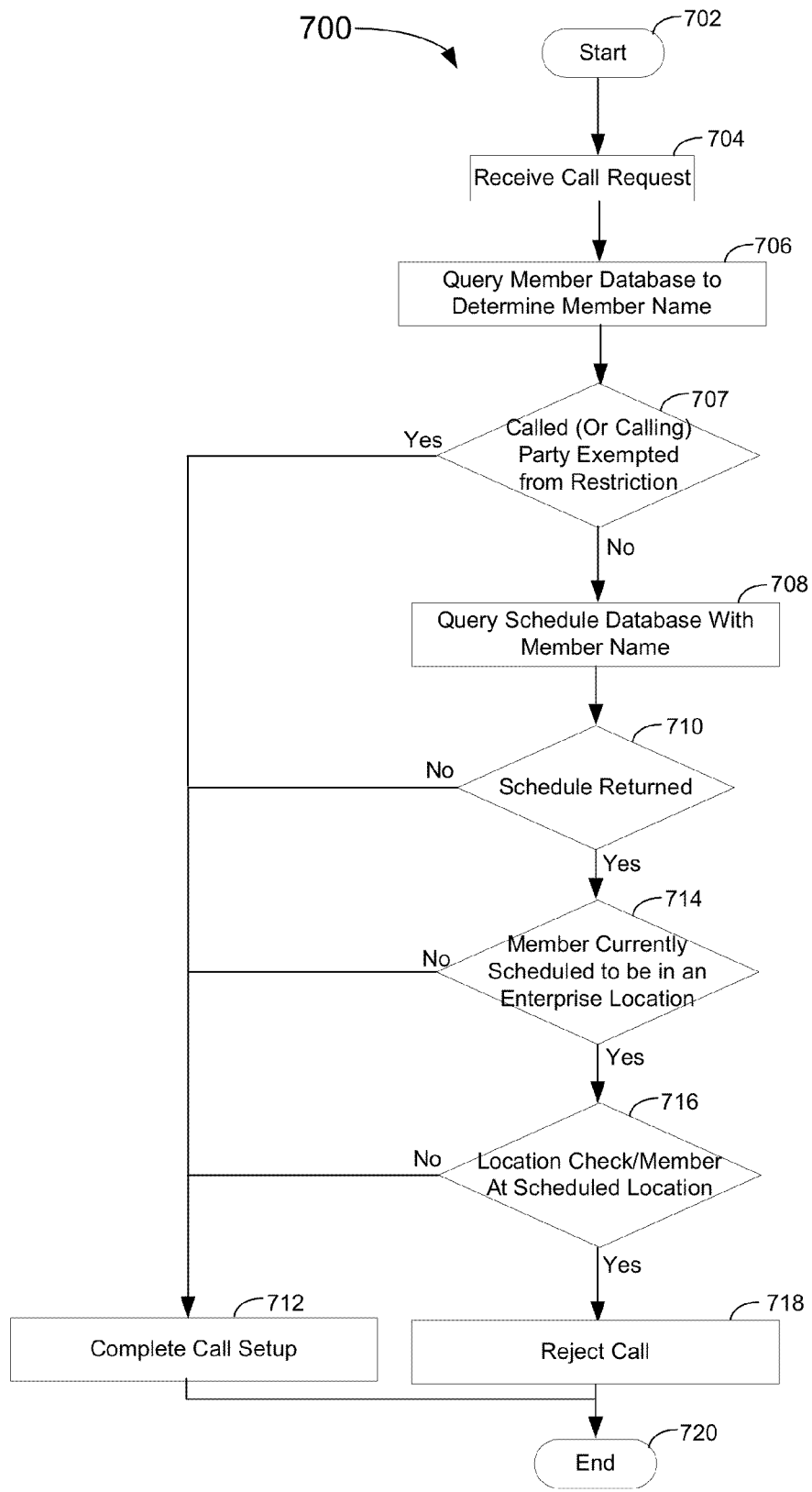
FIG. 7 is a flowchart depicting a schedule-based communications policy enforcement routine that facilitates service restriction exemptions implemented in accordance with an embodiment.

FIG. 7 is a flowchart 700 depicting a schedule-based communications policy enforcement routine that facilitates service restriction exemptions implemented in accordance with an embodiment. The policy enforcement routine of FIG. 7 may be implemented on a computer-readable medium as computer-executable instructions that are fetched from a processing system, such as GS-E 182, and processed thereby.

The policy enforcement routine is invoked (step 702), for example on receipt of an outbound or inbound call request (step 704), i.e., a call placed by an enterprise member or a call directed to an enterprise member. The telephone number of the call request may then be used to interrogate member database 192 to determine the member's name (step 706). GS-E 182 may then evaluate the destination or called number in the event the call is originated from an enterprise member, or alternatively evaluate the origination number in the event the call was placed to an enterprise member, to determine if the called or calling party is designated as an exemption for the member (step 707). If the phone number is identified as an exemption, GS-E 182 may then proceed to complete the call setup (step 712). If the phone number is not evaluated as an exemption, GS-E 182 may then query schedule database 194 with the member's name (step 708). GS-E 182 may then evaluate whether a schedule was received from member database 194 (step 710). In the event that a schedule is not returned responsive to the schedule database query, GS-E 182 may then complete the call setup according to step 712, and the policy enforcement routine cycle may then end (step 720).

Returning again to step 710, in the event that a schedule is returned, GS-E 182 may then evaluate the schedule to determine if the member is currently scheduled to be in an enterprise location (step 714). For example, GS-E 182 may compare a clock maintained thereby or interfaced therewith with schedule fields of the returned schedule. If the member is not scheduled to be in an enterprise location, GS-E 182 may complete the call setup according to step 712. If the member is currently scheduled to be in an enterprise location, the GS-E may then proceed to perform a location check to evaluate if the member is currently located at the scheduled location (step 716). The location check may be implemented as a subroutine for evaluating a member's current location as described more fully hereinbelow with reference to FIG. 9. If it is determined that the member is not currently located at the scheduled location, GS-E 182 may then complete the call setup according to step 712, and the policy enforcement routine cycle may then end according to step 720. If it is determined that the member is located at the scheduled location, the GS-E 182 may then reject the call (step 718), and the policy enforcement routine cycle may then end according to step 720.

In accordance with another embodiment, an enterprise administrator may be authorized to suspend the scheduled-based service prohibition of members based on the members' locations. For example, an administrator at system 196 may perform a query for all members scheduled to be located at a particular enterprise location, or alternatively all members scheduled to be located at any enterprise location excluding a particular location. Any members having a scheduled location that matches the enterprise administrators query may then have their communication services restriction suspended thereby allowing the enterprise member to utilize their telecommunication services. Such an enterprise system feature may be advantageous in an emergency scenario. For example, in the event that an emergency, such as a shooting or other disaster, occurs that effects one of numerous enterprise facilities, such as a particular building, it may be desirable for communication services to be disabled for members that are not scheduled to be located at the building experiencing the emergency. In this manner, overloading of the communication system capacity may be avoided by prohibiting enterprise members that are not directly impacted by the emergency from placing or receiving calls while allowing members that may be directly impacted to place and receive calls. Notably, such a mechanism may prove particularly advantageous from an emergency response team perspective, e.g., a police or fire department, by allowing the emergency response team to place or receive calls to enterprise members effected by the emergency and that have firsthand knowledge of the emergency. To this end, schedule database 194 may include Suspend field 420*h* that contains a value, such as a Boolean True (T) or False (F), that indicates whether schedule-based communications service restrictions for the particular user are currently suspended. The Suspend field 420*h* value may be set by an authorized enterprise administrator based on members' scheduled locations in accordance with an embodiment.

During such an event, the administrator can instruct the GS-E to selectively send a SMS message to those members who have had their services disabled indicating their services have been temporarily disabled along with instructions to evacuate the campus. The GS-E would ensure the SMS messages will bypass the service restrictions in order to be delivered.

Figure 8:
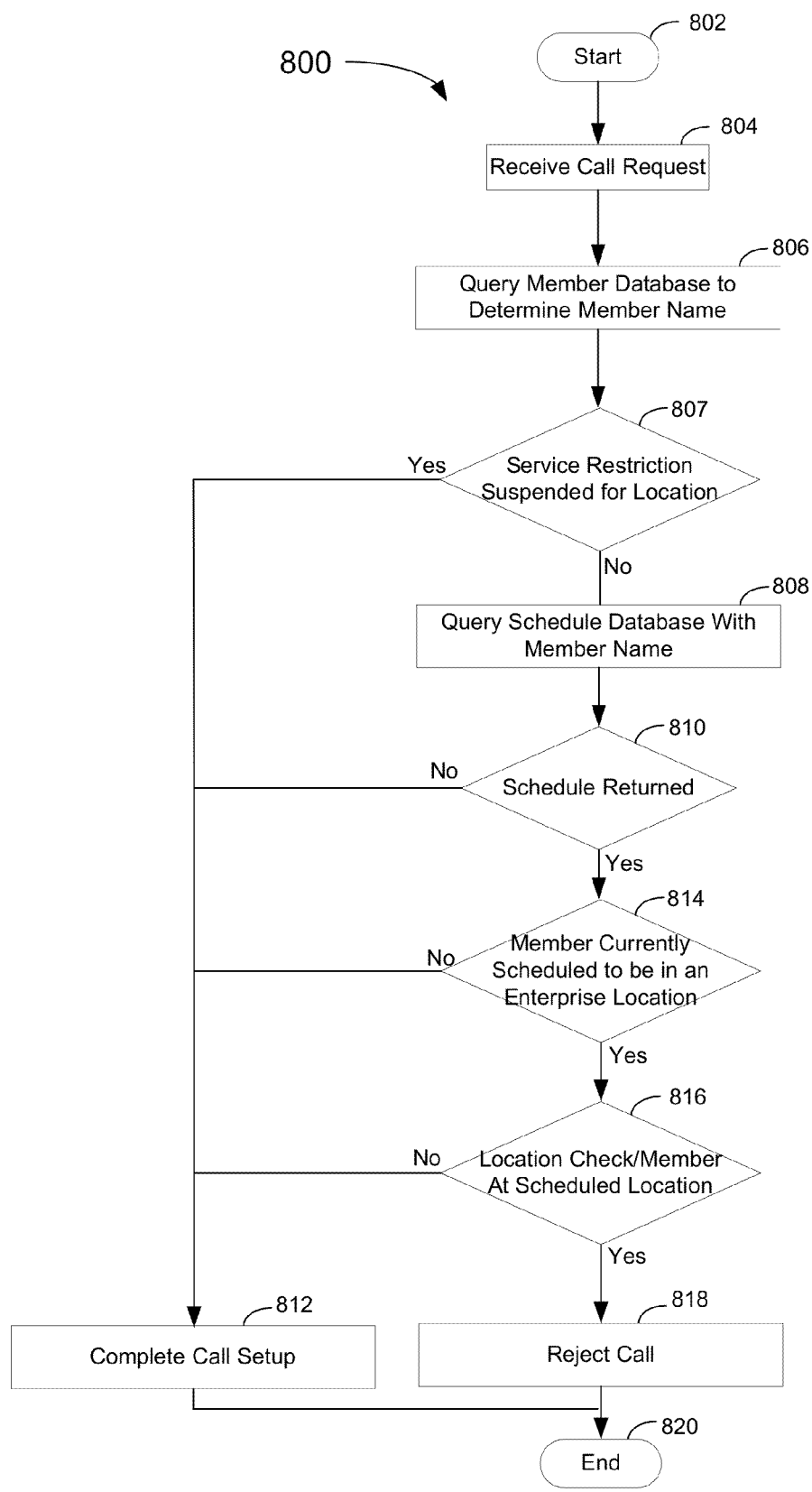
FIG. 8 is flowchart depicting a schedule-based communications policy enforcement routine including emergency service restriction suspension implemented in accordance with an embodiment.

FIG. 8 is a flowchart 800 depicting a schedule-based communications policy enforcement routine including emergency service restriction suspension implemented in accordance with an embodiment. The policy enforcement routine of FIG. 8 may be implemented on a computer-readable medium as computer-executable instructions that are fetched from a processing system, such as GS-E 182, and processed thereby.

The policy enforcement routine is invoked (step 802), for example on receipt of an outbound or inbound call request (step 804), i.e., a call placed by an enterprise member or a call directed to an enterprise member. The telephone number of the call request may then be used to interrogate member database 192 to determine the member's name (step 806). GS-E 182 may evaluate the member's scheduled location to determine if the service restriction has been suspended (step 807), e.g., for emergency purposes. In this instance, GS-E 182 may read the Suspend field 420*h* value to determine if the service restriction has been suspended. If the service restriction has been suspended, GS-E 182 may then allow the call setup to be completed (step 812). If the service restriction has not been suspended, GS-E 182 may then query schedule database 194 with the member's name (step 808). GS-E 182 may then evaluate whether a schedule was received from member database 194 (step 710). In the event that a scheduled is not returned responsive to the schedule database query, GS-E 182 may then complete the call setup (step 812), and the policy enforcement routine cycle may then end (step 820).

Returning again to step 810, in the event that a schedule is returned, GS-E 182 may then evaluate the schedule to determine if the member is currently scheduled to be in an enterprise location (step 814). For example, GS-E 182 may compare a clock maintained thereby or interfaced therewith with schedule fields of the returned schedule. If the member is not scheduled to be in an enterprise location, GS-E 182 may complete the call setup according to step 812. If the member is currently scheduled to be in an enterprise location, GS-E 182 may then proceed to perform a location check to evaluate if the member is currently located at the scheduled location (step 816). The location check may be implemented as a subroutine for evaluating a member's current location as described more fully hereinbelow with reference to FIG. 9. If it is determined that the member is not located at the scheduled location, the GS-E 182 may then complete the call according to step 812, and the policy enforcement routine cycle may then end according to step 820. If it is determined that the member is currently located at the scheduled location, GS-E 182 may then reject the call (step 818), and the policy enforcement routine cycle may then end according to step 820.

As an example, consider the members assigned to MTs 140-141 depicted in FIG. 1. Assume the members are located on enterprise facility 300 at the time 8:30. In this instance, both members assigned to MTs 140 and 141 are scheduled to be in respective building 310 ("Building 1") and building 312 ("Building 2") according to records 410*a* and 410*b* of schedule database 194. Accordingly, under normal, non-emergency or other communication service scheduled-based restrictions, neither MT 140-141 would be allowed to place or receive a call from anyone other than a designated exemption. Assume that an emergency has occurred in building 312 (Building 2), and that an enterprise administrator has supplied a service restriction suspension for any members located in building 312 as designed by the restriction suspension value (T) in record 410*b*. Now assume a call is originated from MT 141. Accordingly, in this instance, although the member assigned to MT 141 is currently scheduled to be located in an enterprise location, the call will be allowed according to the service restriction suspension evaluation at step 816.

Suspension of schedule-based service restrictions may be provided on any physical resolution allocated in schedule database 194. For example, if an emergency is determined to be isolated to a particular room, service restriction may be suspended only for members scheduled to be in a particular room, while other members scheduled to be in the same building where the emergency has occurred may still have their service restriction active. The geographic resolution of the service restriction may be determined and set in schedule database 192 according to the enterprise administrator's judgment.

In various instances, an enterprise member may be scheduled to be at a particular location but, for any number of reasons (e.g., they are home sick, traveling to another location, etc.), may not actually be located at the scheduled location. In these instances, it is desirable to not enforce policy restrictions based on the member's scheduled location.

Figure 9:
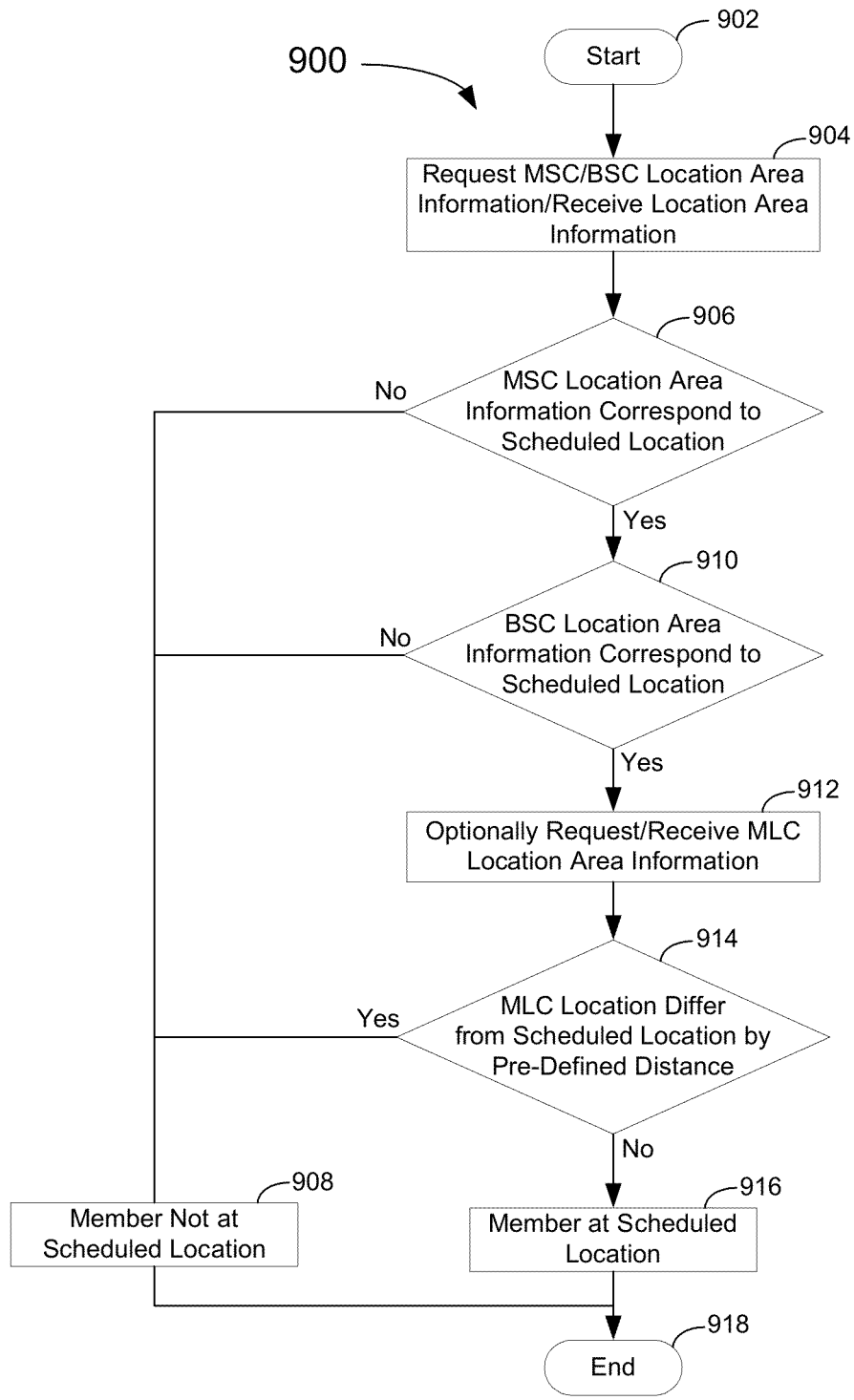
FIG. 9 is a flowchart depicting a location evaluation subroutine implemented in accordance with an embodiment.

FIG. 9 is a flowchart 900 depicting a location evaluation subroutine implemented in accordance with an embodiment. The location evaluation subroutine of FIG. 9 may be implemented on a computer-readable medium as computer-executable instructions that are fetched from a processing system, such as GS-E 182, and processed thereby. The processing steps of FIG. 9 generally correspond to steps 515, 617, 716, and 816 of FIGS. 5-8.

The location evaluation subroutine is invoked (step 902), and GS-E 182 may issue a request for MSC and/or BSC location area information and receive the location information (step 904). The location request may, for example, be issued to GS-C 180 that may interrogate one or more mobile network 110 entities. MSC-level location information provides very general information, such as a general location within a metropolitan area, while BSC-level location provides more detailed information, such as specifying a location within 1 mile of a particular geographic location, such as a highway intersection. GS-E 182 may then evaluate the location information to determine if the MSC location information corresponds to the scheduled location (step 906). If the MSC location information does not correspond to the scheduled location, an indication that the member is not at the scheduled location may be provided by the location evaluation subroutine (step 908) thereby allowing the call setup to complete, and the location evaluation subroutine cycle may then end (step 918).

Returning again to step 906, if the MSC location area information is determined to correspond to the scheduled information, an evaluation may then be made to determine if the BSC location area information corresponds to the scheduled location (step 910). If the BSC location information does not correspond to the scheduled location, an indication that the member is not at the scheduled location may be provided by the location evaluation subroutine according to step 908. If the BSC location information is determined to correspond to the scheduled location, GS-E 182 may optionally issue a request to GS-C 180 for MLC location area information and receive MLC information therefrom (step 912). MLC location area information may specify global positioning system (GPS) information, such as a current latitude and longitude. The location evaluation subroutine may then perform an evaluation to determine if the MLC location information differs from the scheduled location by a predefined distance (step 914). If the MLC location differs from the scheduled location by the predefined distance, the location evaluation subroutine may provide an indication that the member is not at the scheduled location according to step 908. If the MLC location does not differ from the scheduled location by at least the predefined distance, the location evaluation subroutine may then provide an indication that the member is at the scheduled location (step 916) thereby allowing the service policy restrictions to be enforced, and the location evaluation subroutine cycle may then end according to step 918.

As described, embodiments disclosed herein provide mechanisms for enforcing user telecommunication privileges on a per-schedule basis. Enterprise members may have a schedule associated therewith that defines scheduled locations of the users. Telecommunication service privileges may be coordinated with the users' schedules such that communication services are disabled at particular times based on the users' schedules. In other implementations, particular users may have telecommunication services disabled by an administrator in the event of a catastrophe or emergency. By this mechanism, users that are not proximate to a particular catastrophe or emergency area according to the users' schedule may have services disabled while other users that are located more proximate to the emergency may have their telecommunication services enabled. In this manner, the demand on a cellular network may be alleviated thereby increasing the likelihood that users directly impacted by the emergency may receive and place calls or access data services.

While the disclosed embodiments have been described with reference to prohibiting mobile calls according to enterprise member schedules, it should be apparent that enforcing data services, such as mobile Internet access, short message service (SMS), or other data services, may similarly be implemented in accordance with the described embodiments. The descriptions provided herein related to schedule-based restrictions of voice calls is exemplary only and are provided only to facilitate an understanding of the disclosed embodiments.

Although the specific network architecture and nomenclature are depicted and described according to the GSM, it is understood that this is done so for illustrative purposes only and that the network architecture on which embodiments disclosed herein may be applied is not limited to any particular standard, but rather may be equivalently implemented on any other communications system supporting any variety of cellular communication systems, e.g. D-AMPS, GSM, CDMA, IS-41, ANSI-41, UMTS, WiFi, WiMAX, LTE, etc.

The flowcharts of FIGS. 5-9 depict process serialization to facilitate an understanding of disclosed embodiments and are not necessarily indicative of the serialization of the operations being performed. In various embodiments, the processing steps described in FIGS. 5-9 may be performed in varying order, and one or more depicted steps may be performed in parallel with other steps. Additionally, execution of some processing steps of FIGS. 5-9 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure.

What is claimed is:

1. A method, comprising:
   receiving a communications session setup request at a carrier gateway server representing either a call or data session that includes a phone number or data address of a mobile terminal as one of a session originator and a session destination;
   identifying the mobile terminal as a member of an enterprise network;
   routing the communications setup request to an enterprise gateway server;
   interrogating a schedule database via the enterprise gateway server and obtaining a schedule of the member that specifies at least one scheduled location of the member;
   performing a comparison of the schedule with a current time at which the session setup request is received;
   determining the member is scheduled to be at the scheduled location at the current time;
   processing the session according to results of the comparison to create a session decision, wherein processing the session includes one of completing setup of the session, rejecting the session setup and redirecting the session setup; and
   transmitting the session decision to the carrier gateway server.

2. The method of claim 1, wherein processing the session comprises one of rejecting and redirecting the session setup.

3. The method of claim 1, wherein performing a comparison results in determining the mobile terminal is located within a predefined distance of the scheduled location, wherein processing the session comprises one of rejecting and redirecting the session setup.

4. The method of claim 1, wherein performing a comparison results in determining the enterprise member is not scheduled to be at an enterprise location at the current time, wherein processing the session comprises completing the session setup.

5. The method of claim 1, wherein performing a comparison results in determining the enterprise member is scheduled to be at an enterprise location, the method further comprising determining whether one of the session originator and session destination comprises an exempted party.

6. The method of claim 5, wherein one of the session originator and the session destination is determined to comprise an exempted party, and wherein processing the session comprises completing setup of the session.

7. The method of claim 5, wherein neither of the session originator and the session destination is determined to comprise an exempted party, and wherein processing the session comprises one of rejecting and redirecting the session setup.

8. The method of claim 1, further comprising suspending a service restriction of the mobile terminal based on a determination that the enterprise member is located within a predefined distance of a scheduled location.

9. A non-transitory computer-readable medium having computer-executable instructions for execution by a processing system, the computer-executable instructions comprising:
   instructions that receive a communications session setup request at a carrier gateway server representing either a call or data session that includes a phone number or a data address of a mobile terminal as one of a session originator and a session destination;
   instructions that identify the mobile terminal as a member of an enterprise network;
   instructions that route the communications setup request to an enterprise gateway server;
   instructions that interrogate a schedule database and obtain a schedule of the member that specifies at least one scheduled location of the member;
   instructions that perform a comparison of the schedule with a current time at which the session setup request is received;
   instructions that determine via the enterprise gateway server the member is scheduled to be at the scheduled location at the current time;
   instructions that process the session according to results of the comparison to create a session decision, wherein processing of the session includes one of completing setup of the session, rejecting the session setup and redirecting the session setup; and
   instructions that transmit the session decision to the carrier gateway server.

10. The non-transitory computer-readable medium of claim 9, wherein the instructions that perform a comparison result in determining the enterprise member is scheduled to be at an enterprise location at the current time, wherein the instructions that process the session perform at least one of redirecting the session setup, rejecting the session setup and rejecting data services associated with the mobile terminal.

11. The non-transitory computer-readable medium of claim 9, wherein the instructions that perform a comparison determine the enterprise member is not scheduled to be at an enterprise location at the current time, wherein the instructions that process the session complete the session setup.

12. The non-transitory computer-readable medium of claim 9, wherein the instructions that perform a comparison further determine the enterprise member is scheduled to be at an enterprise location, the computer-readable medium further comprising instructions that determine whether one of the session originator and session destination comprises an exempted party.

13. The non-transitory computer-readable medium of claim 12, wherein one of the session originator and the session destination is determined to comprise an exempted party, and wherein the instructions that process the session complete setup of the session.

14. The non-transitory computer-readable medium of claim 12, wherein neither of the session originator and the session destination is determined to comprise an exempted party, and wherein the instructions that process the session reject the session setup.

15. The non-transitory computer-readable medium of claim 9, further comprising instructions that suspend a service restriction of the mobile terminal based on a determination that the enterprise member is located within a predefined distance of the scheduled location.

16. The non-transitory computer-readable medium of claim 9, wherein the instructions that perform a comparison determine the mobile terminal is located within a predefined distance of the scheduled location, and wherein the instructions that process the session reject the session setup.

17. The non-transitory computer-readable medium of claim 9, further comprising instructions that: identify the mobile terminal as having a service restricted; and transmit a data message to the mobile terminal indicating the service has been restricted.

18. A system, comprising:
a cellular network including a carrier gateway server adapted to identify one of a session originator and a session destination as associated with an enterprise network; and
an enterprise network deployed at an enterprise facility including an enterprise gateway server communicatively coupled with the carrier gateway server and adapted to interface with a schedule database that specifies scheduled locations of an enterprise member within the enterprise facility,
wherein the cellular network receives a session setup request that includes a phone number or data address of a mobile terminal which is identified as one of the session originator and the session destination,
wherein the cellular network routes the session setup request to the to the enterprise gateway server,
wherein the enterprise gateway server interrogates the schedule database and obtains a schedule of the member that specifies at least one scheduled location of the member at the enterprise facility, performs a comparison of the schedule with a current time at which the session setup request is received, determines the member is scheduled to be at the scheduled location at the current time and processes the session according to results of the comparison to create a session decision,
wherein processing the session includes one of completing setup of the session, rejecting the session setup and redirecting the session setup and transmitting the session decision to the carrier gateway server.

19. The system of claim 18, wherein the enterprise gateway server determines the enterprise member is scheduled to be located at an enterprise location at the current time, and wherein the enterprise gateway server performs one of rejecting the session setup and redirecting the session setup.

20. The system of claim 18, wherein the enterprise gateway server determines the enterprise member is not scheduled to be located at an enterprise location at the current time, and wherein the enterprise gateway server completes the session setup.

* * * * *